United States Patent [19]

Hauser

[11] 4,292,793

[45] Oct. 6, 1981

[54] HAY HARVESTING MACHINE

[75] Inventor: Hans-Ulrich Hauser, Niederweningen, Switzerland

[73] Assignee: Bucher-Guyer AG Maschinenfabrik, Niederweningen, Switzerland

[21] Appl. No.: 94,968

[22] Filed: Nov. 15, 1979

[30] Foreign Application Priority Data

Nov. 21, 1978 [CH] Switzerland .................. 11900/78

[51] Int. Cl.³ .............................................. A01D 81/00
[52] U.S. Cl. ...................................... 56/378; 56/365; 56/370
[58] Field of Search ............... 56/365, 366, 367, 368, 56/369, 370, 372, 374, 378, 379, 380, 381, 382

[56] References Cited

U.S. PATENT DOCUMENTS

| | | | |
|---|---|---|---|
| 3,751,888 | 8/1973 | James | 56/366 |
| 3,910,019 | 10/1975 | Schlittler | 56/367 |
| 3,975,892 | 8/1976 | Hellkuhl | 56/370 |
| 4,144,699 | 3/1979 | Aron | 56/370 |

FOREIGN PATENT DOCUMENTS 2746734 4/1979 Fed. Rep. of Germany ........ 56/370

Primary Examiner—Robert A. Hafer
Attorney, Agent, or Firm—Werner W. Kleeman

[57] ABSTRACT

A hay harvesting machine containing a rake wheel whose housing is formed by an upper housing portion non-rotatably connected with a vertical upright shaft and a lower housing portion rotatably mounted upon such upright vertical shaft. The lower housing portion is revolvingly driven by means of a gear drive, such as bevel gearing. In the lower housing portion, there are mounted tine supports pivotable about their lengthwise axis. These tine supports extend in tangential direction and, viewed in the direction of revolving motion, extend rearwardly. Each tine support is provided with a control arm carrying a control head or follower guided in a downwardly open control track or cam, having an essentially U-shaped cross-sectional configuration. This control track is located in a plane extending essentially perpendicular to the upright or vertical shaft. This control track possesses a control track section which is essentially coaxial with respect to the upright shaft and merges with a second control track section or portion extending at a greater spacing from the upright shaft than the first control track section or portion. By means of the control arms guided in the control track, the tine supports are pivoted from a rake position into an ineffectual or non-operating position and again back into the rake position.

11 Claims, 4 Drawing Figures

HAY HARVESTING MACHINE

CROSS-REFERENCE TO RELATED CASES

This application is related to my commonly assigned, co-pending application Ser. No. 094,967, filed Nov. 16, 1979, entitled "Hay Harvesting Machine", and the commonly assigned, co-pending U.S. Application Ser. No. 094,966, filed Nov. 16, 1979, entitled "Hay Harvesting Machine".

BACKGROUND OF THE INVENTION

The present invention relates to a new and improved construction of a hay harvesting machine.

Generally speaking, the hay harvesting machine of the invention is of the type comprising at least one rake wheel which revolves about a vertical or upright shaft and contains a number of tine or prong supports equipped with raking tines. The tine supports are arranged to be pivotable about their lengthwise axis at a rotatably driven element or part mounted at the upright shaft. The tine supports extend essentially in tangential direction and are operatively connected with a control track or cam which is non-rotatably or rigidly connected with the upright shaft in order to pivot or rock the tine supports. The control track extends in a plane which is essentially perpendicular to the upright shaft.

A hay harvesting machine of this type is known to the art from Swiss Patent No. 474,940 and the corresponding U.S. Pat. No. 3,546,868. With this hay harvesting machine the rotatably mounted and driven housing portion, supporting the tine support, is arranged above the stationary housing portion provided with the control track. The tine supports therefore are situated at a relatively great spacing above the ground. This, in turn, requires correspondingly long rake tines or prongs. Additionally, because of the drive provided for rotation of the upper housing portion, the entire weight is increased, and the structural height is correspondingly great. This large structural height particularly makes it difficult to rake below trees and bushes having low slung branches or the like. Moreover, this state-of-the-art hay harvesting machine additionally is afflicted with the drawback that the control track must be provided with a bowed-in portion in order to pivot the tine supports, which, viewed in the direction of rotation, extend rearwardly. This bowed-in portion or section of the control track has an opposite curvature in relation to the neighboring control track section. The control arms connected with the tine supports and guided in the control track are therefore subjected to a double deflection when moving in and out of this bowed-in control track section, which produces an increased wear.

SUMMARY OF THE INVENTION

Therefore, with the foregoing in mind, it is a primary object of the present invention to provide a new and improved construction of a hay harvesting machine which is not associated with the aforementioned drawbacks and limitations of the prior art construction.

Another and more specific object of the present invention aims at providing a new and improved construction of hay harvesting machine which is relatively light and not prone to excessive wear and is of relatively small structural height.

Yet a further significant object of the present invention is aimed at providing a new and improved construction of hay harvesting machine of the character described which is relatively simple in design, economical to manufacture, extremely reliable in operation, not readily subject to breakdown or malfunction, and requires a minimum of maintenance and servicing.

Now in order to implement these and still further objects of the invention, which will become more readily apparent as the description proceeds, the hay harvesting machine of the present invention is manifested by the features that the control track which is non-rotatably connected with the upright shaft is arranged above the tine supports.

Since the tine supports are mounted below the control track, their height above the ground, and therefore, also the length of the rake tines or prongs is smaller. The drive for the rotatable part of the housing can be accomodated internally of the housing formed by the rotatable part and a housing part or portion which supports the control track or cam. This affords a beneficial reduction in the structural height of the arrangement.

If such hay harvesting machine is equipped with rearwardly directed tine supports, then the control track is preferably constructed such that it contains a first section or portion which is essentially coaxial with respect to the upright shaft and a second section or portion which, in relation to the first section or portion, extends at a greater spacing from the upright shaft. Due to this design of the control track or cam, the control elements of the tine supports, during their rotation along the control track, are only subjected to gradual directional changes, not however forced to perform any deflection movements. This produces reduced wear of the control elements and/or the control track.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
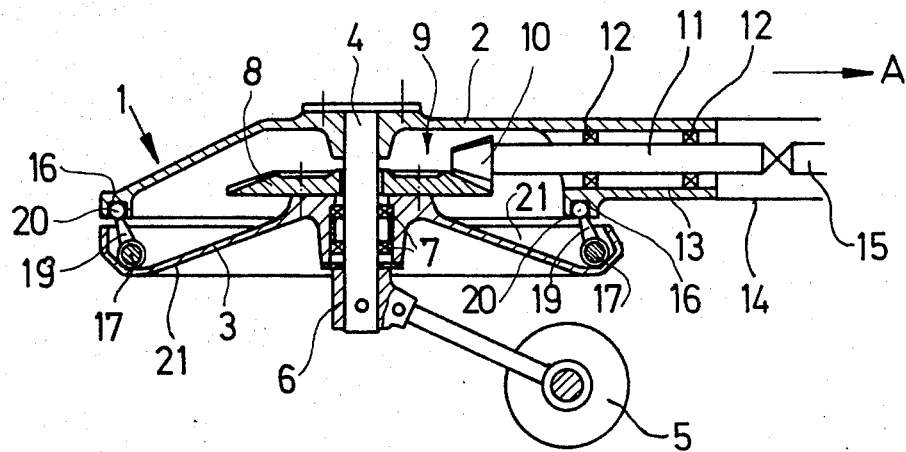
FIG. 1 is a fragmentary vertical sectional view through a rake wheel of a hay harvesting machine according to the invention.

Describing now the drawings, as particularly recognized by referring to FIG. 1, the therein depicted rake wheel or the like of the hay harvesting machine of the present development will be seen to comprise an essentially closed housing 1 which is formed by an upper, substantially bowl-shaped and downwardly open housing portion or section 2 and a lower, likewise substantially bowl-shaped and upwardly open housing portion or section 3. The upper housing portion 2 is non-rotatably connected with a stationary, approximately upright or vertical shaft 4 by any suitable fastening means, for instance, by means of threaded bolts or screws. This upright shaft 4 bears upon the ground by means of a support wheel 5 which is mounted by means of a hub portion 6 at the lower end of the upright or vertical shaft 4. The lower housing portion 3 is rotatably mounted by means of ball bearings 7 at the upright shaft 4.

Figures 2, 3, 4:
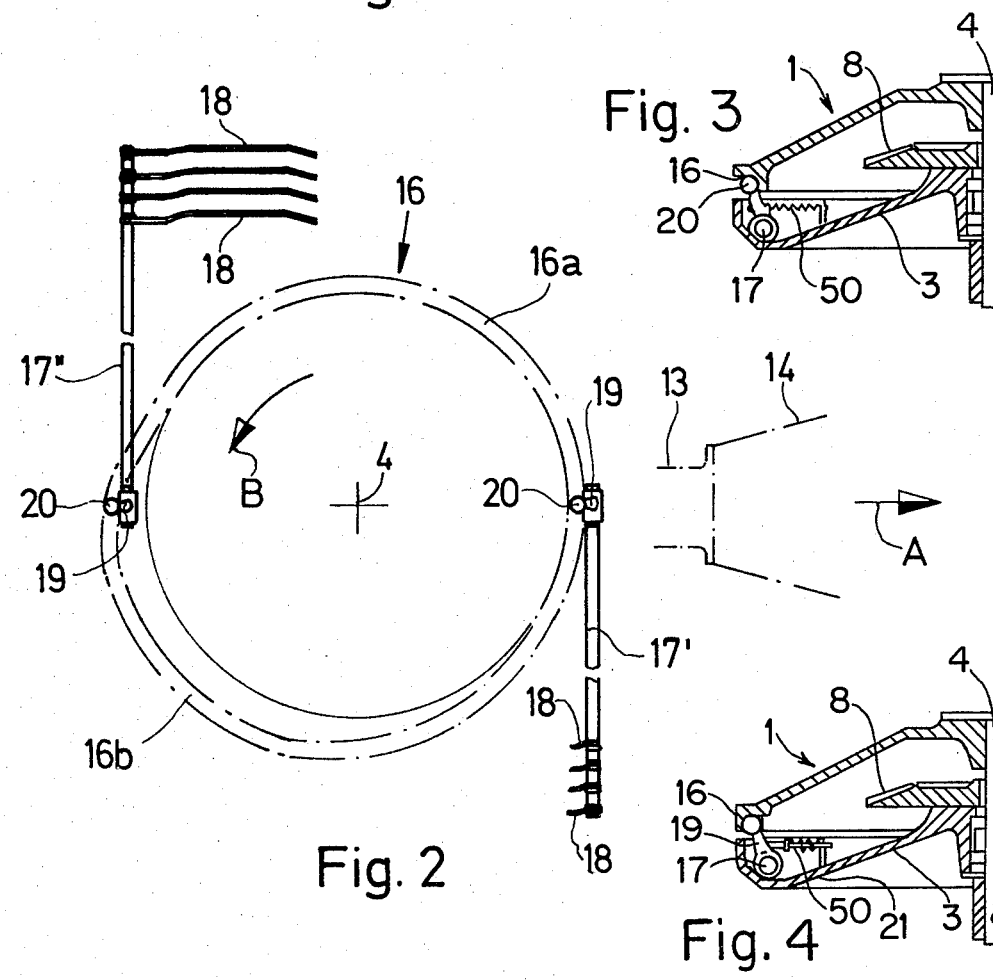
FIG. 2 is a schematic top plan view of the control track or cam of the arrangement of FIG. 1 and provided with two tine supports.
FIGS. 3 and 4 respectively show two further modifications of the control track or cam of the rake wheel of FIG. 1.

The rotatable lower housing portion 3 is revolvingly driven in the direction of the arrow B as best seen by referring to FIG. 2. For this purpose, there is secured a bevel gear 8 of a bevel gear drive 9 at the lower housing portion 3. This bevel gear 8 can be also formed of one piece with the lower housing portion 3. Meshing with this bevel gear 8 is a second bevel gear 10 seated upon a drive shaft 11. This drive shaft 11 is rotatably mounted, by means of ball bearings 12, in a channel-shaped extension element 13 of the upper housing portion 2. As schematically indicated in FIGS. 1 and 2, the rake wheel is connected by means of this extension or prolongation element or piece 13 with a coupling portion or part 14 of a not particularly illustration traction vehicle, typically for instance a tractor. This traction vehicle pulls the rake wheel in the direction of the arrow A. The drive shaft 11 is coupled with the power take-off shaft 15 of the traction vehicle so that the lower housing portion 3 is revolvingly driven in conventional fashion by the traction vehicle.

The upper housing portion 2 is provided at its underside with a closed control track or cam 16 or equivalent structure, extending along the circumference of the housing portion 2, this control track or cam 16 having been shown in chain-dot or phantom lines in FIG. 2. This control track 16 is located in a plane which extends essentially perpendicular to the upright shaft 4, i.e. approximately horizontally, and is formed by a downwardly opened U-shaped profile or sectional element, as particularly well recognized by referring to FIG. 1. As also best seen by referring to FIG. 2, this control track or cam 16 contains a first portion or section 16a which extends essentially coaxially with respect to the upright shaft 4 and merges with a second section or portion 16b. This second section or portion 16b is arranged at a greater spacing from the upright or vertical shaft 4 than the aforementioned first section or portion 16a. By means of this second track or cam portion 16b the control track or cam 16 has imparted thereto a bowed-out configuration.

The control track 16 serves in conventional manner for rocking the tine supports 17. These tine supports 17 are secured in any suitable and thus not further illustrated manner at the lower housing portion 3 in order to be pivotable about their lengthwise axis and carry at their free ends raking tines or prongs 18. The tine supports 17 extend approximately tangentially with respect to the direction of revolving motion of their attachment point at the housing portion 3 and, in the direction of revolution B, extend rearwardly. The tine supports 17 are arranged at a mutual spacing along the circumference of the housing portion or part 3. Although in FIGS. 1 and 2 there have only been illustrated, by way of example, two tine supports 17, it is to be expressly understood, however, that in practice, a larger number of such type tine supports are provided, for instance six or eight tine supports 17. Rotatably connected with each tine support 17 is a control arm 19 having a control head or follower 20 which is guided in the control track or cam 16 at the upper housing portion 2. By means of the control arms 19, guided in the control track or cam 16, the tine supports 17 are rocked during their revolving motion in a manner to be more fully described hereinafter.

During operation, as already described, the lower housing portion 3 together with the tine supports 17 is revolvingly driven in the direction of the arrow B about the upright or vertical shaft 4. As long as the control arms 19 are guided in the circular-shaped track portion or section 16a of the control track or cam 16, the related tine support 17 is rocked into its rake or raking position where the rake tines 18 assume an essentially vertical position directed downwardly towards the ground, as the same has been illustrated in FIG. 2 by the tine supports 17'. The cut material lying on the ground is raked together into a swath in known manner by the action of the rake tines 18 which are located in their raking position.

Now if the control arms 19, during the revolution of the tine supports 17, arrive at the region of the bowed-out control track section or portion 16b, then there is accomplished a rocking or pivoting of the tine supports 17, with the result that the rake tines 18 are raised from the ground and rocked upwardly, as the same has been illustrated in FIG. 2 by the tine support designated by reference character 17''. In this upwardly rocked position, where the rake tines 18 extend opposite to the direction of rotation B, these rake tine 18 are out of engagement with the previously formed swath. During such time as the corresponding control arm 19 of the tine support passes through control track section 16b, there is accomplished a gradual return pivoting of the tine support back into its rake position, where it is then finally pivoted as soon as it again reaches the region of the control cam section or portion 16a.

Since by virtue of the bowed-out construction of the control track or cam 16 the control arms 19 can gradually travel into the control track section 16b which has a greater spacing from the upright or vertical shaft 4 than the track section or portion 16a, the control heads or followers 20, guided in the control track or cam 16, are not forced to undergo a directional change which is unfavorable from the standpoint of wear being exerted thereat, rather only experience a gradual directional change. The same of course is also true when the control head or follower travels out of the control track section 16b. In this way there can be beneficially reduced the wear of the control track 16 and/or the control heads or followers 20.

Due to the construction of the housing 1 as a closed housing, the components which are housed within the housing 1 are protected against contamination or soiling. There is additionally precluded any impairment of the mode of operation of the equipment by foreign bodies penetrating from externally into the housing interior. The upwardly open, bowl-shaped configuration of the lower housing portion 3 enables utilizing this housing portion 3 as an oil vat 21 (FIG. 1). Due to the rotation of the lower housing portion 3 the oil contained in the oil vat 21 is propelled outwardly and partially also upwardly, producing a faultless lubrication of the tine support bearings and also the control followers or heads 20 guided in the control track or cam 16.

Instead of designing the control track 16 as a U-shaped sectional element or profile member, it is also possible to construct it as a substantially L-shaped sectional or profile element which is downwardly open and also open to one side, as shown in FIGS. 3 and 4. If there is used an outwardly open L-shaped sectional element, then the control arms must be pressed, for instance by spring force against the leg of the sectional element which extends downwardly against the inner side, for instance as by the tension spring 50 of FIG. 3. Instead of designing, as shown, the lower housing portion 3 so as to be closed towards the bottom, this housing portion 3 also can have the shape of a downwardly open spoke wheel, in which case the tine supports 17 are attached at the spoke arms of the spoke wheel. It is also possible to positionally adjust the lower housing portion 3 in relation to the control track or cam 16.

In order to obtain larger working widths, it is also conceivable to arrange next to one another two or more rake wheels of the previously described type. If these rake wheels are driven to rotate in the same directional sense, then the material reposing upon the ground is transferred from one rake wheel to the neighboring rake wheel, and by the control of the tine supports there is ensured for a frictionless transfer. With oppositely rotating, driven sake wheels, a swath is formed between each two respective neighboring, oppositely rotating rake wheels.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A hay harvesting machine comprising:
   at least one rake wheel rotatable about an upright axis;
   said rotatable rake wheel comprising:
      an essentially upright shaft defining said upright axis;
      a rotatable housing portion;
      means for rotatably mounting said rotatable housing portion for rotation about said upright shaft;
      a number of tine supports each having a lengthwise axis mounted for pivotable movement about their lengthwise axis at the rotatable housing portion;
      each of said tine supports having rake tines;
      each of said tine supports extending essentially in tangential direction with respect to said rotatable housing portion;
      control track means connected non-rotatably with said upright shaft for pivoting said tine supports;
      said control track means extending in a plane disposed essentially perpendicular to said upright shaft;
      said control track means being arranged above said tine supports;
      said tine supports extend rearwardly with respect to the direction of rotation; and
      said control track means comprising a first track portion arranged essentially coaxially with respect to the upright shaft and a second track portion which, in relation to the first track portion, extends at a greater spacing from said upright shaft.

2. A hay harvesting machine comprising:
   at least one rake wheel rotatable about an upright axis;
   said rotatable rake wheel comprising:
      an essentially upright shaft defining said upright axis;
      a rotatable housing portion;
      means for rotatably mounting said rotatable housing portion for rotation about said upright shaft;
      a number of tine supports each having a lengthwise axis mounted for pivotable movement about their lengthwise axis at the rotatable housing portion;
      each of said tine supports having rake tines;
      each of said tine supports extending essentially in tangential direction with respect to said rotatable housing portion;
      control track means connected non-rotatably with said upright shaft for pivoting said tine supports;
      said control track means extending in a plane disposed essentially perpendicular to said upright shaft; and
      said control track means being arranged above said tine supports.

3. The hay harvesting machine as defined in claim 1, further including:
   a control element rigidly connected for rotation with each tine support;
   each said control element being guided in said control track means.

4. The hay harvesting machine as defined in claim 1, further including:
   a control element rigidly connected for rotation with each tine support;
   each said control element being guided in said control track means.

5. The hay harvesting machine as defined in claim 4, wherein:
   said control track means is constituted by a downwardly open, essentially U-shaped configured track element.

6. The hay harvesting machine as defined in claim 4, wherein:
   said control track means is formed by an essentially L-shaped configured track member which is downwardly open and open to one side.

7. The hay harvesting machine as defined in claim 1, further including:
   an additional stationary housing portion connected non-rotatably with the upright shaft;
   said control track means being mounted at said additional housing portion; and
   said additional housing portion together with said rotatable housing portion forming a closed housing.

8. The hay harvesting machine as defined in claim 1, wherein:
   said rotatable housing portion is downwardly open.

9. The hay harvesting machine as defined in claim 1, wherein:
   said rotatable housing portion is structured as an oil vat.

10. The hay harvesting machine as defined in claim 7, further comprising:
    gearing drive means operatively connected with said rotatable housing portion;
    said gearing drive means comprising a first gear for rotating the rotatable housing portion;
    said gearing drive means comprising a second gear meshing with said first gear; and
    a drive shaft for driving said second gear and guided in said additional stationary housing portion.

11. The hay harvesting machine as defined in claim 10, wherein:
    said first gear and said rotatable housing portion are formed of one-piece.

* * * * *